(12) United States Patent
Araki

(10) Patent No.: US 9,862,796 B2
(45) Date of Patent: Jan. 9, 2018

(54) ONE-PART MOISTURE-CURABLE POLYURETHANE COMPOSITION

(71) Applicant: The Yokohama Rubber Co., LTD., Minato-ku, Tokyo (JP)

(72) Inventor: Kiminori Araki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/307,359

(22) PCT Filed: Dec. 25, 2014

(86) PCT No.: PCT/JP2014/084338
§ 371 (c)(1),
(2) Date: Oct. 27, 2016

(87) PCT Pub. No.: WO2015/166610
PCT Pub. Date: Nov. 5, 2015

(65) Prior Publication Data
US 2017/0058076 A1 Mar. 2, 2017

(30) Foreign Application Priority Data
Apr. 30, 2014 (JP) ................................ 2014-094066

(51) Int. Cl.
| | | |
|---|---|---|
| C08G 18/10 | (2006.01) | |
| C08G 18/78 | (2006.01) | |
| C09J 175/04 | (2006.01) | |
| C08G 18/48 | (2006.01) | |
| C08G 18/67 | (2006.01) | |
| C08G 18/73 | (2006.01) | |
| C08G 18/76 | (2006.01) | |
| C08G 18/79 | (2006.01) | |
| C08G 18/80 | (2006.01) | |
| C08G 18/12 | (2006.01) | |
| C08G 18/32 | (2006.01) | |
| C09J 175/08 | (2006.01) | |
| C09J 175/14 | (2006.01) | |

(52) U.S. Cl.
CPC ............ *C08G 18/10* (2013.01); *C08G 18/12* (2013.01); *C08G 18/3206* (2013.01); *C08G 18/4812* (2013.01); *C08G 18/4825* (2013.01); *C08G 18/4829* (2013.01); *C08G 18/6715* (2013.01); *C08G 18/73* (2013.01); *C08G 18/7671* (2013.01); *C08G 18/7831* (2013.01); *C08G 18/7893* (2013.01); *C08G 18/792* (2013.01); *C08G 18/8025* (2013.01); *C09J 175/04* (2013.01); *C09J 175/08* (2013.01); *C09J 175/14* (2013.01)

(58) Field of Classification Search
CPC .... C08G 18/10; C08G 18/12; C08G 18/3206; C08G 18/4812; C08G 18/4825; C08G 18/4829; C08G 18/6715; C08G 18/73; C08G 18/7671; C08G 18/7831; C08G 18/7893; C08G 18/792; C08G 18/8025; C08G 18/282; C08G 18/2825; C09J 175/04; C09J 175/08; C09J 175/14
See application file for complete search history.

(56) References Cited

U.S. PATENT DOCUMENTS

| | | | | |
|---|---|---|---|---|
| 3,718,712 A | * | 2/1973 | Tushaus ............. | C08G 18/2825 427/208.4 |
| 3,767,040 A | * | 10/1973 | Tushaus ............. | C08G 18/2825 206/411 |
| 3,932,561 A | * | 1/1976 | Zamer ................ | B32B 27/00 156/331.7 |
| 6,657,035 B1 | * | 12/2003 | Nakata ................ | C08G 18/10 528/18 |
| 2004/0234487 A1 | | 11/2004 | Bremser et al. | |
| 2008/0292902 A1 | * | 11/2008 | Reid .................. | C08G 18/12 428/626 |

FOREIGN PATENT DOCUMENTS

| | | | |
|---|---|---|---|
| GB | 1111178 A * | 4/1968 | ......... C08G 18/2825 |
| JP | H02-247217 | 10/1990 | |
| JP | H11-080306 | 3/1999 | |
| JP | H11-263962 | 9/1999 | |
| JP | 2003201460 | 7/2003 | |
| JP | 2004-168957 | 6/2004 | |
| JP | 2005-503461 | 2/2005 | |
| JP | 2006-131794 | 5/2006 | |
| JP | 2006-131802 | 5/2006 | |
| JP | 2006-169348 | 6/2006 | |
| JP | 2007-281306 | 10/2007 | |
| JP | 2008-038019 | 2/2008 | |
| WO | WO 03/025041 | 3/2003 | |

OTHER PUBLICATIONS

International Search Report for International Application No. PCT/JP2014/084338 dated Mar. 24, 2015, 4 pages, Japan.

* cited by examiner

*Primary Examiner* — Michael L Leonard
(74) *Attorney, Agent, or Firm* — Thorpe North & Western

(57) ABSTRACT

A one-part moisture-curable polyurethane composition of the present technology comprises: a preliminary composition containing a urethane prepolymer (A); and an adhesion promoter (B); the adhesion promoter being a reaction product of a compound (b1) having three or more isocyanate groups; and a compound (b2) of at least one type of a compound selected from the group consisting of compounds represented by Formula (1) to (4) described below and hydrogenated compounds of compounds represented by Formula (1) to (3) described below; wherein a ratio (NCO/OH) between an isocyanate group (NCO) of the compound (b1) and a hydroxy group (OH) of the compound (b2) is 1.2 to 3.2; and a content of the adhesion promoter (B) being 0.1 to 10 parts by mass per 100 parts by mass of the preliminary composition.

9 Claims, No Drawings

ONE-PART MOISTURE-CURABLE POLYURETHANE COMPOSITION

TECHNICAL FIELD

The present technology relates to a one-part moisture-curable polyurethane composition.

BACKGROUND ART

Various urethane resin compositions have been widely used as sealing agents, adhesive agents, and the like.

As such urethane resin compositions, two-part type compositions containing a polyol compound and an isocyanate compound, and one-part type compositions that are curable by moisture in the air or the like have been known. However, from the perspective of ease in handling that does not require mixing and/or adjusting the composition on site when the composition is used, or the like, use of one-part moisture-curable polyurethane compositions has been increasing recently.

For example, Japanese Unexamined Patent Application Publication No. 2004-168957A describes "a one-part moisture-curable polyurethane composition comprising: an isocyanate silane compound, the isocyanate silane compound being a reaction product of a compound, which has at least three isocyanate groups and which is obtained by reacting trimethylolpropane with diisocyanate compound, with a secondary aminosilane having a specific structure; and a urethane prepolymer" (Claim 1).

Furthermore, Japanese Unexamined Patent Application Publication Nos. 2006-131794A and 2006-131802A describe a one-part moisture-curable urethane composition comprising, relative to a composition prepared in advance containing a predetermined urethane prepolymer, filler, and plasticizer: "a compound (A) obtained by reacting a compound, obtained by reacting trimethylolpropane with bifunctional isocyanate in a manner that the equivalent weight ratio of NCO groups relative to OH groups is from 0.8 to 1.5, with a compound, having an imino group in which an aryl group is directly bonded to a nitrogen atom and having a hydrolyzable silyl group, in a manner that the equivalent weight ratio of NCO groups relative to NH groups is from 1.8 to 3.5"; "a compound (B) obtained by reacting a compound that is at least one type selected from the group consisting of isocyanurates and biurets of bifunctional isocyanate and compounds obtained by reacting bifunctional isocyanate with triol, with a compound, having an imino group in which an aryl group is directly bonded to a nitrogen atom and having a hydrolyzable silyl group, in a manner that the equivalent weight ratio of NCO groups relative to NH groups is from 1.8 to 3.5"; and "a compound (C) that is at least one type selected from the group consisting of isocyanurates and biurets of bifunctional isocyanate and compounds obtained by reacting bifunctional isocyanate with triol" and "an organotin compound" (Claim 1 of respective Japanese Unexamined Patent Application Publication Nos. 2006-131794A and 2006-131802A).

Japanese Unexamined Patent Application Publication No. 2006-131802A further describes a one-part moisture-curing urethane composition comprising "dimorpholinodiethylether" and "N, N-dimethylaminoethylmorpholine" as well as an organotin compound (Claim 1).

Furthermore, Japanese Unexamined Patent Application Publication No. 2008-038019A describes "a one-part moisture-curable urethane resin composition comprising: a urethane prepolymer (A); a compound (B) obtained by reacting at least one type of modified hexamethylene diisocyanate selected from the group consisting of reaction products of hexamethylene diisocyanate and trimethylolpropane, biurets of hexamethylene diisocyanate, and isocyanurates of hexamethylene diisocyanate, with an imino group-containing alkoxysilane; a polymer (C) having a particular structural unit; and a catalyst (D)" (Claim 1).

However, it was found that, depending on the type of an adhesion promoter (e.g. isocyanate silane compound in Japanese Unexamined Patent Application Publication No. 2004-168957A, or the like) or the type of an adherend (a coated plate), adhesion may be deteriorated with conventionally known one-part moisture-curable polyurethane compositions described in Japanese Unexamined Patent Application Publication Nos. 2004-168957A, 2006-131794A, 2006-131802A, 2008-038019A, or the like.

SUMMARY

The present technology provides a one-part moisture-curable polyurethane composition which exhibits an excellent adhesion to an adherend (a coated plate).

As a result of diligent research, the present inventors discovered that adhesion to an adherend (a coated plate) can be greatly improved by compounding specific amounts of a reaction product of a compound having three or more isocyanate groups and a compound of at least one type of a compound selected from the group consisting of compounds represented by Formula (1) to (4) described later and hydrogenated compounds of compounds represented by Formula (1) to (3), as an adhesion promoter, and completed the technology.

Specifically, the inventors discovered the following features.

[1] A one-part moisture-curable polyurethane composition comprising:

a preliminary composition containing a urethane prepolymer (A); and an adhesion promoter (B);

the adhesion promoter being a reaction product of a compound (b1) having three or more isocyanate groups; and a compound (b2) of at least one type of a compound selected from the group consisting of compounds represented by Formula (1) to (4) and hydrogenated compounds of compounds represented by Formula (1) to (3) described below;

wherein a ratio (NCO/OH) between an isocyanate group (NCO) of the compound (b1) and a hydroxy group (OH) of the compound (b2) is 1.2 to 3.2; and a content of the adhesion promoter (B) being 0.1 to 10 parts by mass per 100 parts by mass of the preliminary composition.

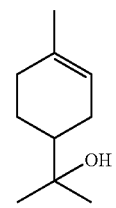

(1)

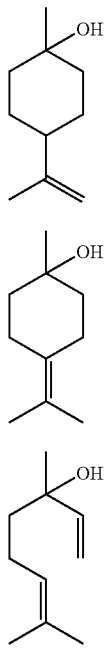

[2] The one-part moisture-curable polyurethane composition according to [1], further comprising an organotin compound (C), wherein a content of the organotin compound (C) is 0.001 to 0.5 parts by mass per 100 parts by mass of the preliminary composition.

[3] The one-part moisture-curable polyurethane composition according to [1] or [2], further comprising a tertiary amine compound (D), wherein a content of the amine compound (D) is 0.01 to 4 parts by mass per 100 parts by mass of the preliminary composition.

[4] The one-part moisture-curable polyurethane composition according to any one of [1] to [3], wherein the compound (b1) is at least one type selected from the group consisting of a reaction product of a diisocyanate compound and trimethylolpropane or glycerin at a ratio NCO/OH of 1.8 to 2.2, biurets of diisocyanate compounds and isocyanurates of diisocyanate compounds.

According to the present technology, a one-part moisture-curable polyurethane composition having excellent adhesion to an adherend (a coated plate) is provided.

DESCRIPTION OF EMBODIMENT

A one-part moisture-curable polyurethane composition of the present technology (a polyurethane composition of the present technology, hereafter) is a one-part moisture-curable polyurethane composition comprising:
a preliminary composition containing a urethane prepolymer (A); and
an adhesion promoter (B);
the adhesion promoter being a reaction product of
a compound (b1) having three or more isocyanate groups; and
a compound (b2) of at least one type of a compound selected from the group consisting of compounds represented by Formula (1) to (4) described below and hydrogenated compounds of compounds represented by Formula (1) to (3) described below;
wherein a ratio (NCO/OH) between an isocyanate group (NCO) of the compound (b1) and a hydroxy group (OH) of the compound (b2) is 1.2 to 3.2.

A "preliminary composition" herein is a composition, which contains a component other than an adhesion promoter (B) and an optional organotin compound (C) described below, and a tertiary amine compound (D). Specifically, a preliminary composition is a composition containing a urethane prepolymer (A) and an optional additive (e.g. a filler, a plasticizer and the like).

A urethane prepolymer (A), an adhesion promoter (B), an organotin compound (C) and a tertiary amine compound (D) are described in detail below.

Urethane Prepolymer (A)

A urethane prepolymer (A) used in the polyurethane composition of the present technology can be a conventionally known urethane prepolymer that is also used in a typical one-part polyurethane composition. For example, a reaction product can be used which is obtained by reacting a polyisocyanate compound with an active hydrogen compound having at least two active hydrogen groups in a molecule in a manner that the amount of the isocyanate group is in excess relative to the amount of the active hydrogen group.

Furthermore, the urethane prepolymer (A) may contain from 0.5 to 5 mass % of NCO groups at the molecular ends.

Polyisocyanate Compound

The polyisocyanate compound used upon producing the urethane prepolymer (A) is not particularly limited as long as the polyisocyanate compound has two or more isocyanate groups in a molecule.

Specific examples of the polyisocyanate compound include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; isocyanurate-modified polyisocyanates thereof; and the like.

Such a polyisocyanate compound may be used alone, or a combination of two or more types of these polyisocyanate compounds may be used.

Among these, from the perspectives of achieving a good balance between storage stability and curing rate of the polyurethane composition of the present technology that contains the resulting urethane prepolymer (A) and excellent mechanical strength of the cured product, the polyisocyanate compound is preferably an aromatic polyisocyanate, more preferably TDI and/or MDI, and even more preferably MDI.

Active Hydrogen Compound Having at Least Two Active Hydrogen Groups in a Molecule The active hydrogen compound having at least two active hydrogen groups in a molecule that is used upon producing the urethane prepolymer (A) is not particularly limited.

Preferred examples of the active hydrogen compound include polyol compounds having two or more hydroxy (OH) groups in a molecule, polyamine compounds having two or more amino group(s) and/or imino group(s) in a molecule. Among these, a polyol compound is more preferable.

The polyol compound is not particularly limited with respect to its molecular weight, skeleton, and the like as long as the polyol compound is a compound having two or more OH groups, and specific examples thereof include low-molecular-weight polyhydric alcohols, polyether polyols, polyester polyols, other types of polyols, and polyol mixtures thereof.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, 1,1,1-trimethylolpropane (TMP), 1,2,5-hexanetriol, and pentaerythritol; and sugars such as sorbitol.

As the polyether polyols and polyester polyols, compounds derived from the low-molecular-weight polyhydric alcohols are typically used, but in the present technology, compounds derived from aromatic diols, amines, and alkanolamines described below may also be favorably used.

Here, specific examples of the aromatic diols include resorcin (m-dihydroxybenzene), xylylene glycol, 1,4-benzene dimethanol, styrene glycol, 4,4'-dihydroxyethyl phenol; and compounds having bisphenol skeletons of a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, or a bisphenol AF structure described below.

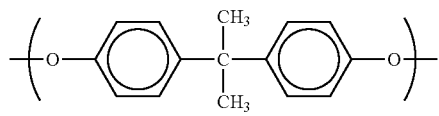
BISPHENOL A STRUCTURE

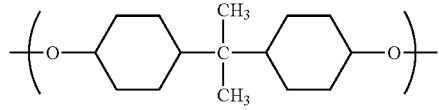
HYDROGENATED BISPHENOL A STRUCTURE

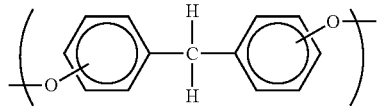
BISPHENOL F STRUCTURE

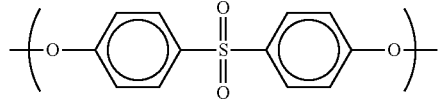
BISPHENOL S STRUCTURE

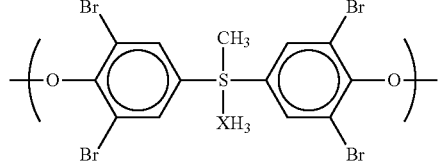
BROMINATED BISPHENOL A STRUCTURE

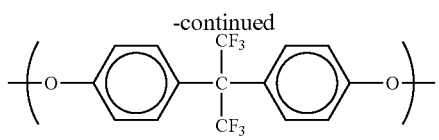
BISPHENOL AF STRUCTURE

Additionally, specific examples of the amines include ethylenediamine, and hexamethylenediamine. Specific examples of the alkanolamines include ethanolamine, and propanolamine.

Examples of the polyether polyols include polyols obtained by adding at least one type selected from styrene oxide, alkylene oxides such as ethylene oxide, propylene oxide, butylene oxide (tetramethylene oxide), and tetrahydrofuran, or the like, to at least one type selected from the compounds that are exemplified as the low-molecular-weight polyhydric alcohols, the aromatic diols, the amines, and the alkanolamines described above; and the like.

Specific examples of the polyether polyol include polyethylene glycol, polypropylene glycol (PPG), polypropylene triol, ethylene oxide/propylene oxide copolymers, polytetramethylene ether glycol (PTMEG), polytetraethylene glycol, and sorbitol polyol.

Likewise, examples of the polyester polyol include the condensation products (condensed polyester polyols) of any of the low-molecular-weight polyhydric alcohols, the aromatic diols, the amines, or the alkanolamines with a polybasic carboxylic acid; lactone polyols; polycarbonate polyols; and the like.

Specific examples of the polybasic carboxylic acid which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acid, oligomeric acid, castor oil, hydroxycarboxylic acid such as a reaction product of castor oil and ethylene glycol (or propylene glycol).

In addition, specific examples of the lactone polyols include compounds that are obtained by ring-opening polymerization of a lactone such as ε-caprolactone, α-methyl-ε-caprolactone, or ε-methyl-ε-caprolactone with a suitable polymerization initiator, and that have hydroxy groups at both ends.

Specific examples of other polyol include acrylic polyol; polybutadiene polyol; and polymeric polyol having carbon-carbon bonds on the main chain skeleton, such as hydrogenated polybutadiene polyol.

In the present technology, the various polyol compounds exemplified above may be used alone or may be used in a combination of two or more types.

Among these, the polyol compound is preferably polypropylene glycol from the perspectives of achieving excellent viscosity of the resulting urethane prepolymer (A) as well as the polyurethane composition of the present technology achieving excellent mechanical strength, water resistance, and cost.

Furthermore, a polyol with a weight average molecular weight of approximately 100 to 10000 is preferable, and a polyol with a weight average molecular weight of 1000 to 5000 is more preferable. When the weight average molecular weight is within this range, the physical properties (e.g. hardness, breaking strength, and breaking elongation) and the viscosity of the resulting urethane prepolymer (A) is favorable.

Specific examples of the polyamine compound include aliphatic polyamines such as ethylenediamine, propylenediamine, butylenediamine, diethylenetriamine, triethylenetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, manufactured by Dupont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, and diamino diethyldiphenylmethane; N-aminoethylpiperazine; monoamine having an ether bond in its main chain, such as 3-butoxyisopropylamine; diamines having a polyether backbone, that is exemplified by JEFFAMINE EDR148 manufactured by Sun Techno Chemicals Co., Ltd.; alicyclic polyamines such as isophoronediamine, 1,3-bisaminomethylcyclohexane (1,3BAC, manufactured by Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, manufactured by Mitsui Chemicals, Inc.); polyamide amines having an amino group at a molecular end of polyamide; 2,5-dimethyl-2,5-hexamethylene diamine, menthenediamine, 1,4-bis(2-amino-2-methylpropyl)piperazine, JEFFAMINE D230 and JEFFAMINE D400, manufactured by Sun Techno Chemicals Co., Ltd., having polypropylene glycol (PPG) as a backbone. These polyamine compounds may be used alone or may be used in a combination of two or more types.

Among these, diamine having a polyether backbone (JEFFAMINE) and hexamethylene diamine are preferable.

Optional Components

The polyurethane composition of the present technology may contain, if necessary, various additives, in a range that does not inhibit the object of the present technology, such as fillers, plasticizers, anti-sagging agents, antiaging agents, antioxidants, pigments (dyes), thixotropic agents, ultraviolet absorbers, flame retardants, surfactants (including leveling agents), dispersing agents, dehydrating agents, adhesion promoters, and antistatic agents.

Among these, the preliminary composition preferably contains fillers and plasticizers.

Filler

The filler can be an organic or inorganic filler of any form. Specific examples thereof include carbon black, calcium carbonate, heavy calcium carbonate, precipitated calcium carbonate (light calcium carbonate), colloidal calcium carbonate, magnesium carbonate, zinc carbonate, fumed silica, calcined silica, precipitated silica, pulverized silica, molten silica, diatomaceous earth, iron oxide, zinc oxide, titanium oxide, barium oxide, magnesium oxide, pyrophyllite clay, kaolin clay, calcined clay; fatty acid treated products, resin acid treated products, urethane compound treated products, and fatty acid ester treated products thereof. One type of these may be used alone or two or more types may be used in combination.

In the present technology, a content of the filler, if used, is preferably from 20 to 60 mass %, and more preferably from 30 to 50 mass % of a total mass of the preliminary composition.

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone or two or more types of these may be used in combination.

In the present technology, a content of the plasticizer, if used, is preferably from 4 to 40 mass %, and more preferably from 25 to 35 mass % of a total mass of the preliminary composition.

Examples of anti-sagging agents include acetylene black, Ketjen black, and colloidal silica.

Specific examples of the anti-aging agent include compounds such as hindered phenol compounds.

Specific examples of the antioxidant include butylhydroxytoluene (BHT), and butylhydroxyanisole (BHA).

Specific examples of the pigment include inorganic pigments such as titanium oxide, zinc oxide, ultramarine, iron red, lithopone, lead, cadmium, iron, cobalt, aluminum, hydrochlorides, and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, and carbon black.

Specific examples of the thixotropic agent include Aerosil (manufactured by Nippon Aerosil), and Disparlon (manufactured by Kusumoto Chemicals, Ltd.).

Specific examples of the adhesion promoter include terpene resins, phenol resins, terpene-phenol resins, rosin resins, and xylene resins.

Specific examples of the flame retardant include chloroalkyl phosphates, dimethyl-methyl phosphates, brominephosphorus compounds, ammonium polyphosphates, neopentyl bromide polyethers, and brominated polyethers.

Specific examples of the antistatic agent include quaternary ammonium salts; and hydrophilic compounds such as polyglycols, and ethylene oxide derivatives.

Adhesion Promoter

An adhesion promoter (B), which is contained in a one-part moisture-curable polyurethane composition but not contained in a preliminary composition is;

a reaction product of a compound (b1) having three or more isocyanate groups; and a compound (b2) of at least one type of a compound selected from the group consisting of compounds represented by Formula (1) to (4) described below and hydrogenated compounds of compounds represented by Formula (1) to (3) described below;

where a ratio (NCO/OH) between an isocyanate group (NCO) of the compound (b1) and a hydroxy group (OH) of the compound (b2) is 1.2 to 3.2.

As described above, Japanese Unexamined Patent Application Publication No. 2004-168957A describes "a reaction product of a compound, which has at least three isocyanate groups and which is obtained by reacting trimethylolpropane with diisocyanate compound, with a secondary aminosilane having a specific structure" and Japanese Unexamined Patent Application Publication Nos. 2006-131794A and 2006-131802A describe "a compound (A) obtained by reacting a compound, obtained by reacting trimethylolpropane with bifunctional isocyanate in a manner that the equivalent weight ratio of NCO groups relative to OH groups is from 0.8 to 1.5, with a compound, having an imino group in which an aryl group is directly bonded to a nitrogen atom and having a hydrolyzable silyl group, in a manner that the equivalent weight ratio of NCO groups relative to NH groups is from 1.8 to 3.5". However, none of these documents describes the compound represented by Formula (1) to (4) described below and hydrogenated compounds of compounds represented by Formula (1) to (3).

In the present technology, a predetermined amount of such an adhesion promoter (B) allows the polyurethane composition of the present technology to achieve excellent adhesion to an adherend (a coated plate).

The details are not entirely clear, however, the following reasons are conceivable.

That is, it is considered that the adhesion promoter, which is a reaction product of a compound (b1) having three or more conventional isocyanate groups and a compound (b2) of at least one type of a compound selected from the group consisting of compounds represented by Formula (1) to (4) described below and hydrogenated compounds of compounds represented by Formula (1) to (3) described below, can enhance wettability to an adherend (a coated plate).

In addition, this effect is rather surprising because the effect is not achievable if aminosilane (e.g. γ-N-phenylaminopropyltrimethoxysilane) or a compound similar to terpineol represented by Formula (1) to (3) described below (e.g. carvenol, perill alcohol, verbenol, and the like) is used.

Compound (b1)

The compound (b1) used during the preparation of the adhesion promoter (B) is not particularly limited as long as it has three or more isocyanate groups. Specific examples of the compounds include a reaction product of a diisocyanate compound and trimethylolpropane (abbreviated as TMP hereafter) or glycerin at a ratio NCO/OH of 1.8 to 2.2, biurets of diisocyanate compounds, isocyanurates of diisocyanate compounds. One type of such a compound can be used alone or two or more types can be used in combination.

Examples of the diisocyanate compound used in the production of the compound (b1) include a compound having two isocyanate groups in a molecule, among polyisocyanate compounds used during the production of the urethane prepolymer (A) described above.

Among these diisocyanate compounds, aliphatic polyisocyanate is preferred, and HDI is more preferred, from the perspective of achieving better adhesion of the polyurethane composition of the present technology containing the adhesion promoter (B) obtained, to an adherend (a coated plate).

Reaction Product of Diisocyanate Compound and TMP

The reaction product of diisocyanate and TMP is a reaction product of diisocyanate compound and TMP at an equivalent weight ratio NCO/OH of 1.8 to 2.2, and can be prepared in the same manner as preparation of a regular urethane prepolymer. For example, the reaction product can be prepared by heating and stirring HDI and TMP at 50 to 100° C. at the equivalent weight ratio described above.

Note that urethanization catalysts, such as organotin compounds, organic bismuth, and amine, can be also used as necessary.

Suitable examples of the reaction products includes a compound represented by Formula (5) below.

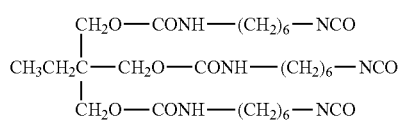

(5)

Reaction Product of Diisocyanate Compound and Glycerin

The reaction product of diisocyanate compound and glycerin is a reaction product of diisocyanate compound and glycerin at an equivalent weight ratio NCO/OH of 1.8 to 2.2, and can be prepared in the same manner as preparation of a regular urethane prepolymer. For example, the reaction product can be prepared by heating and stirring HDI and glycerin at 50 to 100° C. at the equivalent weight ratio described above.

Note that urethanization catalysts, such as organotin compounds, organic bismuth, and amine, can be also used as necessary.

Suitable examples of the reaction products includes a compound represented by Formula (6) below.

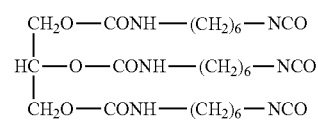

(6)

Biurets of Diisocyanate Compounds

Suitable examples of the biurets of diisocyanate compounds includes a compound represented by Formula (7) below.

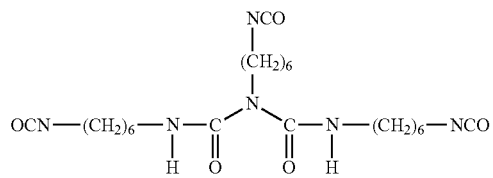

(7)

Isocyanurates of Diisocyanate Compounds

Suitable examples of the isocyanurates of diisocyanate compounds includes a compound represented by Formula (8) below.

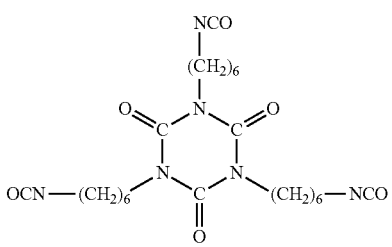

(8)

Compound (b2)

The compound (b2) that is used during the preparation of the adhesion promoter (B) is at least one type of a compound selected from the group consisting of compounds represented by Formula (1) to (4) described below and hydrogenated compounds of compounds represented by Formula (1) to (3) described below.

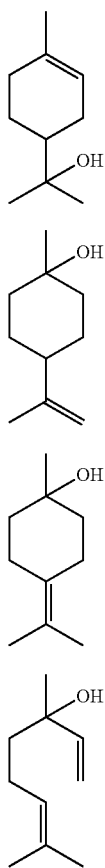

(1)
(2)
(3)
(4)

Among these compounds, a compound represented by Formula (1) above (α-terpineol), a compound represented by Formula (2) above (β-terpineol), or a compound represented by Formula (3) above (γ-terpineol) is preferably used, and one type of these compounds may be used alone or two or more types may be used in combination.

Preparation of Adhesion Promoter (B)

The adhesion promoter (B) is a reaction product of the above described compound (b1) and the compound (b2), at the ratio (NCO/OH) of isocyanate groups of the compound (b1) and hydroxy groups of the compound (b2) at 1.2 to 3.2.

The reaction above can be performed in the same manner as preparation of a regular urethane prepolymer. For example, the reaction product can be prepared by heating and stirring the compound (b1) and the compound (b2) at 50 to 100° C. at the equivalent weight ratio described above.

Note that urethanization catalysts, such as organotin compounds, organic bismuth, and amine, can be also used as necessary.

In the present technology, the content of the adhesion promoter (B) described above is preferably from 0.1 to 10 parts by mass, more preferably from 0.5 to 8 parts by mass, and even more preferably from 1 to 5 parts by mass per 100 parts by mass of the preliminary composition.

Organotin Compound (C)

The polyurethane composition of the present technology preferably includes an organotin compound (C) as an optional component that is not contained in the preliminary composition, because the compound can improve adhesion to an adherend (a coated plate), and, in particular, enables adhesion to an adherend at low temperatures without using a primer.

Examples of the organotin compound (C) described above include conventionally known organotin compounds, and specific examples include dioctyltin dilaurate, dibutyltin dilaurate, dibutyltin maleate, tin(I) octate, dibutyltin diacetylacetonate, and dioctyltin maleate. One type of these compounds can be used alone or two or more types can be used in combination.

Other examples of the organotin compounds described above include a reaction product of 1,3-diacetoxy-1,1,3,3-etrabutyldistannoxane and ethyl silicate at molar ratio of 1:0.8 to 1:1.2 (abbreviated simply as "distannoxane compound" in this paragraph hereafter).

The organotin compound is preferably a dibutyltin diacetylacetonate or a distannoxane compound and more preferable a distannoxane compound, because the compound can improve adhesion to an adherend (a coated plate) at low temperatures and also can improve water resistant adhesion.

If the organotin compound (C) described above is contained in the present technology, the content thereof is preferably from 0.001 to 0.5 parts by mass, and more preferably from 0.01 to 0.10 parts by mass, per 100 parts by mass of the preliminary composition.

Tertiary Amine Compound

The polyurethane composition of the present technology preferably contains a tertiary amine compound (D) as an optional component that is not contained in the preliminary composition, from the viewpoint of control of an appropriate curing rate.

Examples of the tertiary amine compound (D) include conventionally known tertiary amine catalysts, and specific examples of such compounds include trimethylamine, triethylamine, tripropylamine, tributylamine, triamylamine, trihexylamine, trioctylamine, trilaurylamine, dimethylethylamine, dimethylpropylamine, dimethylbutylamine, dimethylamylamine, dimethylhexylamine, dimethylcyclohexylamine, dimethyloctylamine, dimethyllaurylamine, triallylamine, tetramethylethylenediamine, triethylenediamine, N-methylmorpholine, 4,4'-(oxydi-2,1-ethanediyl)bis-morpholine, N,N-dimethylaminoethylmorpholine, N,N-dimethylbenzylamine, pyridine, picoline, dimethylaminomethylphenol, trisdimethylaminomethylphenol, 1,8-diazabicyclo[5.4.0]undecene-1,1,4-diazabicyclo[2.2.2]octane, triethanolamine, N,N'-dimethylpiperazine, tetramethyl butanediamine, dimorpholinodiethylether, bis(2,2-morpholinoethyl)ether, and bis(dimethylaminoethyl)ether. One type of these compounds can be used alone or two or more types can be used in combination.

Among these compounds, N,N-dimethylamino ethylmorpholine or dimorpholinodiethylether is preferable, and the combination thereof is more preferable, because these compounds can improve coating formability during coating and can achieve better balance between storage stability and curing rate.

If the tertiary amine compound (D) described above is contained in the present technology, the content thereof is preferably from 0.01 to 4 parts by mass, and more preferably from 0.1 to 0.8 parts by mass, per 100 parts by mass of the preliminary composition described above.

If N,N-dimethylamino ethylmorpholine is used as the tertiary amine compound (D) described above, the content thereof is preferably from 0.01 to 2.0 parts by mass, and more preferably from 0.01 to 0.2 parts by mass, per 100 parts by mass of the preliminary composition described above.

If dimorpholinodiethylether is used as the tertiary amine compound (D) described above, the content thereof is preferably from 0.01 to 2.0 parts by mass, and more preferably from 0.05 to 0.8 parts by mass, per 100 parts by mass of the preliminary composition described above.

The method of producing the polyurethane composition of the present technology is not particularly limited. For example, the polyurethane composition can be produced by blending the urethane prepolymer (A) and various additives to prepare the preliminary composition, followed by adding the adhesion promoter (B), and the optional organotin compound (C) and the tertiary amine compound (D) to the mixture, then blending the mixture sufficiently at room temperature or under heat (40 to 60° C., e.g. 40° C.) using a roll, kneader, extruder, all-purpose stirrer, and the like to disperse (knead) the mixture uniformly.

EXAMPLES

The polyurethane composition of the present technology will be described in detail below with reference to examples. However, the present technology is not limited to these examples.

Preparation of Preliminary Composition

Urethane Prepolymer (A-1)

Urethane prepolymer (A-1), in which the content of isocyanate group was 1.45%, was synthesized by mixing 500 g of polyoxypropylene diol (average molecular weight: 2000), 1150 g of polyoxypropylene triol (average molecular weight: 5000), and 264 g of 4,4'-diisocyanate phenylmethane (molecular weight: 250) (NCO/OH=1.8 in this case), further adding 800 g of diisononyl phthalate, and stirring in a nitrogen gas stream at 80° C. for 24 hours to allow reaction to proceed.

The preliminary composition was prepared by blending 130 parts by mass of the synthesized urethane prepolymer (A-1), 70 parts by mass of carbon black (N220, manufactured by NSCC Carbon Co., Ltd.), 40 parts by mass of heavy calcium carbonate (SUPER S, manufactured by Maruo Calcium Co., Ltd.) and 40 parts by mass of diisononyl phthalate (DINP, manufactured by J-PLUS Co., Ltd.) using a mixer.

Preparation of Adhesion Promoter

Synthesis of Compound (b1-1)

As the compound (b1-1) used for the preparation of the adhesion promoter, an HDI-TMP adduct (synthesized product) represented by Formula (5) above was used. Note that the synthesis was performed by adding TMP dropwise, while being stirred, to a flask, in which HDI was added in advance, at an equivalent weight ratio of NCO/OH of 2.0, and then allowing a reaction to proceed at 80° C. for 24 hours.

Compound (b1-2)

As the compound (b1-2) used for the preparation of the adhesion promoter, an HDI isocyanurate (D170N, manufactured by Mitsui Chemicals) represented by Formula (8) above was used.

Compound (b1-3)

As the compound (b1-3) used for the preparation of the adhesion promoter, an HDI biuret (D165N, manufactured by Mitsui Chemicals) represented by Formula (7) above was used.

Preparation of Adhesion Promoter B-1

The HDI isocyanurate, which is the compound (b1-2) above, and a mixture of terpineols represented by Formula (1) to (3) above (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter B-1.

Preparation of Adhesion Promoter B-2

The HDI biuret, which is the compound (b1-3) above, and a mixture of terpineols represented by Formula (1) to (3) above (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter B-2.

Preparation of Adhesion Promoter B-3

The HDI-TMP adduct, which is the compound (b1-1) above, and a mixture of terpineols represented by Formula (1) to (3) above (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter B-3.

Preparation of Adhesion Promoter B-4

The HDI biuret, which is the compound (b1-3) above, and a compound represented by Formula (4) above (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter B-4.

Preparation of Adhesion Promoter B-5

The HDI biuret, which is the compound (b1-3) above, and a mixture of hydrogenated compounds of terpineols represented by Formula (1) to (3) above (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter B-5.

Preparation of Adhesion Promoter X-1

The HDI isocyanurate, which is the compound (b1-2) above, and a mixture of terpineols represented by Formula (1) to (3) above (manufactured by Nippon Terpene Chemicals, Inc.) were mixed at an equivalent weight ratio (NCO/OH) of 1.1. The mixture was heated and stirred for 30 minutes at 80° C. to obtain the adhesion promoter X-1.

Preparation of Adhesion Promoter X-2

The HDI isocyanurate, which is the compound (b1-2) above, and a mixture of terpineols represented by Formula (1) to (3) above (manufactured by Nippon Terpene Chemicals, Inc.) were mixed at an equivalent weight ratio (NCO/OH) of 3.3. The mixture was heated and stirred for 30 minutes at 80° C. to obtain the adhesion promoter X-2.

Preparation of Adhesion Promoter X-3

The HDI biuret, which is the compound (b1-3) above, and carvenol represented by Formula (9) below (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter X-3.

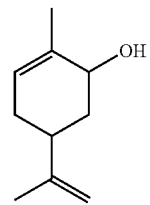

(9)

Preparation of Adhesion Promoter X-4

The HDI biuret, which is the compound (b1-3) above, and perill alcohol represented by Formula (10) below (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter X-4.

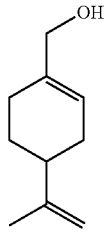

(10)

Preparation of Adhesion Promoter X-5

The HDI biuret, which is the compound (b1-3) above, and verbenol represented by Formula (11) below (manufactured by Nippon Terpene Chemicals, Inc.) were mixed at an equivalent weight ratio (NCO/OH) of 3.0. The mixture was heated and stirred for 30 minutes at 80° C. to obtain the adhesion promoter X-5.

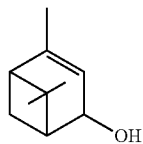

(11)

Working Examples 1 to 22 and Comparative Examples 1 to 8

The components shown in Table 1 below were blended in a mixer according to the compositions (part by mass) shown in Table 1 to obtain the polyurethane compositions shown in Table 1.

Adhesion Under High-temperature High-humidity

Each prepared urethane composition was applied to an adherend for curability evaluation test (a glass coated with a primer (MS-90, manufactured by Yokohama Rubber Co., Ltd.)), left for 3 hours under the conditions of 20° C. and 60% relative humidity, and immersed in a warm water of 40° C. for 24 hours.

One end of the cured product of the urethane composition was then held and peeled back by 180 degrees to evaluate the failure state. Cohesive failure of the cured product was defined as CF (the values are areas of cohesive failure of the cured products relative to the peeled areas of the cured products in %) and interfacial failure between the primer and the cured product was defined as PS (the values are the areas of interfacial failure between the primer and the cured products relative to the peeled area of the cured products in %).

Curability

Each prepared urethane composition was applied to an adherend for curability evaluation test (a glass coated with a primer (MS-90, manufactured by Yokohama Rubber Co., Ltd.)), and the skinning time was measured when the composition was cured under the conditions of 20° C. and 60% relative humidity.

A composition with a skinning time of 20 minutes or longer and less than 70 minutes was evaluated as having good curability and rated "Good", while a composition with a skinning time of 70 minutes or longer and less than 100 minutes was evaluated as having satisfactory curability for practical use and rated "Fair". A composition with a skinning time either less than 20 minutes or 100 minutes or longer was evaluated as having poor curability and rated "Poor".

Flow Resistance

Each urethane composition prepared on a glass plate was extruded through a right triangular bead of 6 mm in base and 10 mm in height to a strip shaped extrudate. The extrudate was immediately attached to holding equipment, held at an angle of 90° and left for 30 minutes under the conditions of 20° C. and 65% relative humidity.

The distance h of sagging (flow) of the apex of each urethane composition after 30 minutes of standing was measured.

Storage Stability

Each of the prepared polyurethane composition was placed in a container, sealed, and stored for 7 days at 40° C. Thereafter, SOD viscosity (Pa·s) was measured, and the rate of the viscosity increase was calculated using the SOD viscosity prior to the storage. The results are shown in Table 1 below.

Note that the SOD viscosity was measured using a pressure viscometer (ASTM D 1092) in accordance with JASO M338-89.

Heat-resistant Adhesiveness

Each prepared urethane composition was applied to an adherend for curability evaluation test (a glass coated with a primer (MS-90, manufactured by Yokohama Rubber Co., Ltd.)), left for 7 days under the conditions of 20° C. and 60% relative humidity, and further left for 5 days at 120° C., then cooled down to 20° C. slowly.

One end of the cured product of the urethane composition was then held and peeled back by 180 degrees to evaluate the failure state. Cohesive failure of the cured product was defined as CF (the values are areas of cohesive failure of the cured products relative to the peeled areas of the cured products in %) and interfacial failure between the primer and the cured product was defined as PS (the values are the areas of interfacial failure between the primer and the cured products relative to the peeled area of the cured products in %).

Breaking Elongation (Elongation at Break)

A cured product of each composition obtained above was cut out into a dumbbell-shaped test piece with a thickness of 2 mm (No. 3 dumbbell shape), and the breaking elongation (%) was measured in accordance with JIS K6251-2010.

Adhesiveness to a Coated Plate 1 to 3

The coating material 1 to 3 described below were applied to steel plates to provide the coated plates 1 to 3, respectively. The urethane compositions were applied to these coated plates without using a primer and left for 7 days under the conditions of 20° C. and 60% relative humidity.

One end of the cured product of the urethane composition was then held and peeled back by 180 degrees to evaluate the failure state. Cohesive failure of the cured product was defined as CF (the values are areas of cohesive failure of the cured products relative to the peeled areas of the cured products in %) and interfacial failure between the primer and the cured product was defined as PS (the values are the areas of interfacial failure between the primer and the cured products relative to the peeled area of the cured products in %).

Coating Material 1: Acid/Epoxy-type coating material
Coating Material 2: Acryl/Melamine-type coating material
Coating Material 3: Acryl/Silicon-type coating material

TABLE 1

| | Comparative Examples | | | | | | | |
|---|---|---|---|---|---|---|---|---|
| | 1 | 2 | 3 | 4 | 5 | 6 | 7 | 8 |
| Preliminary composition | 100 | 100 | 100 | 100 | 100 | 100 | 100 | 100 |
| Compound (b1-1) | 1 | | | | | | | |
| Compound (b1-2) | | 1 | | | | | | |
| Adhesion promoter B-1 | | | | | | | | |
| Adhesion promoter B-2 | | | | | | | | |
| Adhesion promoter B-3 | | | | | | | | |
| Adhesion promoter B-4 | | | | | | | | |
| Adhesion promoter B-5 | | | | | | | | |
| Organotin compound C-1 | 0.01 | 0.01 | 0.01 | 0.01 | | | | 0.01 |
| Organotin compound C-2 | | | | | | | | |
| Tertiary amine compound D-1 | 0.1 | 0.1 | 0.1 | 0.1 | 0.1 | 0.1 | 0.1 | 0.1 |
| Tertiary amine compound D-2 | 0.02 | 0.02 | 0.02 | 0.02 | 0.02 | 0.02 | 0.02 | 0.02 |
| Adhesion promoter X-1 | | | 1 | | | | | |
| Adhesion promoter X-2 | | | | 1 | | | | |
| Adhesion promoter X-3 | | | | | 1 | | | |
| Adhesion promoter X-4 | | | | | | 1 | | |
| Adhesion promoter X-5 | | | | | | | 1 | |
| Adhesion promoter Y-1 | | | | | | | | 1 |
| High-temperature/high-humidity adhesiveness | CF100 | CF100 | CF100 | CF100 | CF100 | CF100 | CF100 | CF100 |
| Curability | Good | Good | Good | Good | Good | Good | Good | Good |
| Flow resistance | 0 | 0 | 0 | 1 | 0 | 0 | 0 | 0 |
| Storage stability | 10 | 10 | 10 | 10 | 10 | 10 | 10 | 10 |
| Heat-resistant adhesiveness | CF100 | CF100 | PS30 | CF100 | CF100 | CF100 | CF100 | CF100 |
| Breaking elongation | 420 | 420 | 400 | 350 | 450 | 430 | 430 | 450 |
| Adhesiveness: coated plate 1 | CF100 | CF100 | CF100 | CF100 | CF100 | CF100 | CF100 | CF100 |
| Adhesiveness: coated plate 2 | CF100 | CF100 | CF100 | CF100 | AF30 | CF100 | AF50 | CF100 |
| Adhesiveness: coated plate 3 | AF100 | AF100 | AF15 | AF70 | AF100 | AF100 | AF100 | AF50 |

| | Working Examples | | | | | | |
|---|---|---|---|---|---|---|---|
| | 1 | 2 | 3 | 4 | 5 | 6 | 7 |
| Preliminary composition | 100 | 100 | 100 | 100 | 100 | 100 | 100 |
| Compound (b1-1) | | | | | | | |
| Compound (b1-2) | | | | | | | |
| Adhesion promoter B-1 | 0.1 | 1 | 5 | 1 | 1 | 1 | |
| Adhesion promoter B-2 | | | | | | | 1 |
| Adhesion promoter B-3 | | | | | | | |
| Adhesion promoter B-4 | | | | | | | |
| Adhesion promoter B-5 | | | | | | | |
| Organotin compound C-1 | 0.01 | 0.01 | 0.01 | 0.001 | 0.5 | 0.01 | 0.01 |
| Organotin compound C-2 | | | | | | | |
| Tertiary amine compound D-1 | 0.1 | 0.1 | 0.1 | 0.1 | 0.1 | | 0.1 |
| Tertiary amine compound D-2 | 0.02 | 0.02 | 0.02 | 0.02 | 0.02 | 2 | 0.02 |
| Adhesion promoter X-1 | | | | | | | |
| Adhesion promoter X-2 | | | | | | | |
| Adhesion promoter X-3 | | | | | | | |
| Adhesion promoter X-4 | | | | | | | |
| Adhesion promoter X-5 | | | | | | | |
| Adhesion promoter Y-1 | | | | | | | |
| High-temperature/high-humidity adhesiveness | CF100 | CF100 | CF100 | CF100 | CF100 | CF100 | CF100 |
| Curability | Good | Good | Good | Good | Good | Good | Good |
| Flow resistance | 0 | 0 | 0 | 0 | 0 | 1.3 | 0 |
| Storage stability | 10 | 10 | 10 | 10 | 10 | 15 | 10 |
| Heat-resistant adhesiveness | CF100 | CF100 | CF100 | CF100 | PS5 | CF100 | CF100 |
| Breaking elongation | 450 | 400 | 280 | 440 | 440 | 440 | 420 |
| Adhesiveness: coated plate 1 | CF100 | CF100 | CF100 | CF100 | CF100 | CF100 | CF100 |
| Adhesiveness: coated plate 2 | CF100 | CF100 | CF100 | CF100 | CF100 | CF100 | CF100 |
| Adhesiveness: coated plate 3 | CF100 | CF100 | CF100 | CF100 | CF100 | CF100 | CF100 |

| | Working Examples | | | | | | | |
|---|---|---|---|---|---|---|---|---|
| | 8 | 9 | 10 | 11 | 12 | 13 | 14 | 15 | 16 |
| Preliminary composition | 100 | 100 | 100 | 100 | 100 | 100 | 100 | 100 | 100 |
| Compound (b1-1) | | | | | | | | | |
| Compound (b1-2) | | | | | | | | | |
| Adhesion promoter B-1 | | | | | | | | | |
| Adhesion promoter B-2 | | | | | | | | | |
| Adhesion promoter B-3 | 1 | 0.1 | 5 | | | | | | |
| Adhesion promoter B-4 | | | | 0.1 | 1 | 5 | | | |
| Adhesion promoter B-5 | | | | | | | 0.1 | 1 | 5 |
| Organotin compound C-1 | 0.01 | 0.01 | 0.01 | 0.01 | 0.01 | 0.01 | 0.01 | 0.01 | 0.01 |
| Organotin compound C-2 | | | | | | | | | |

TABLE 1-continued

|  |  |  |  |  |  |  |  |  |  |
|---|---|---|---|---|---|---|---|---|---|
| Tertiary amine compound D-1 | 0.1 | 0.1 | 0.1 | 0.1 | 0.1 | 0.1 | 0.1 | 0.1 | 0.1 |
| Tertiary amine compound D-2 | 0.02 | 0.02 | 0.02 | 0.02 | 0.02 | 0.02 | 0.02 | 0.02 | 0.02 |
| Adhesion promoter X-1 | | | | | | | | | |
| Adhesion promoter X-2 | | | | | | | | | |
| Adhesion promoter X-3 | | | | | | | | | |
| Adhesion promoter X-4 | | | | | | | | | |
| Adhesion promoter X-5 | | | | | | | | | |
| Adhesion promoter Y-1 | | | | | | | | | |
| High-temperature/high-humidity adhesiveness | CF100 | CF100 | CF100 | CF100 | CF100 | CF100 | CF100 | CF100 | CF100 |
| Curability | Good | Good | Good | Good | Good | Good | Good | Good | Good |
| Flow resistance | 0 | 0 | 0 | 0 | 0 | 0 | 0 | 0 | 0 |
| Storage stability | 10 | 10 | 10 | 10 | 10 | 10 | 10 | 10 | 10 |
| Heat-resistant adhesiveness | CF100 | CF100 | CF100 | CF100 | CF100 | CF100 | CF100 | CF100 | CF100 |
| Breaking elongation | 400 | 440 | 270 | 430 | 350 | 300 | 440 | 360 | 280 |
| Adhesiveness: coated plate 1 | CF100 | CF100 | CF100 | CF100 | CF100 | CF100 | CF100 | CF100 | CF100 |
| Adhesiveness: coated plate 2 | CF100 | CF100 | CF100 | CF100 | CF100 | CF100 | CF100 | CF100 | CF100 |
| Adhesiveness: coated plate 3 | CF100 | CF100 | CF100 | CF100 | CF100 | CF100 | CF100 | CF100 | CF100 |

| | Working Examples | | | | | |
|---|---|---|---|---|---|---|
| | 17 | 18 | 19 | 20 | 21 | 22 |
| Preliminary composition | 100 | 100 | 100 | 100 | 100 | 100 |
| Compound (b1-1) | | | | | | |
| Compound (b1-2) | | | | | | |
| Adhesion promoter B-1 | 1 | 1 | 1 | 1 | 1 | 5.3 |
| Adhesion promoter B-2 | | | | | | |
| Adhesion promoter B-3 | | | | | | |
| Adhesion promoter B-4 | | | | | | |
| Adhesion promoter B-5 | | | | | | |
| Organotin compound C-1 | | 0.7 | 0.01 | 0.01 | 0.01 | 0.01 |
| Organotin compound C-2 | 0.01 | | | | | |
| Tertiary amine compound D-1 | 0.1 | 0.1 | 0.005 | 2.2 | 0.1 | 0.1 |
| Tertiary amine compound D-2 | 0.02 | 0.02 | 0.02 | 0.02 | 2.2 | 0.02 |
| Adhesion promoter X-1 | | | | | | |
| Adhesion promoter X-2 | | | | | | |
| Adhesion promoter X-3 | | | | | | |
| Adhesion promoter X-4 | | | | | | |
| Adhesion promoter X-5 | | | | | | |
| Adhesion promoter Y-1 | | | | | | |
| High-temperature/high-humidity adhesiveness | CF100 | CF100 | PS10 | PS80 | CF100 | CF100 |
| Curability | Good | Good | Poor | Poor | Fair | Good |
| Flow resistance | 0 | 0 | 0 | 0 | 3 | 0 |
| Storage stability | 10 | 12 | 8 | 18 | 20 | 12 |
| Heat-resistant adhesiveness | CF100 | PS50 | CF100 | CF100 | CF100 | PS10 |
| Breaking elongation | 400 | 450 | 440 | 440 | 450 | 220 |
| Adhesiveness: coated plate 1 | CF100 | CF100 | CF100 | CF100 | CF100 | CF100 |
| Adhesiveness: coated plate 2 | CF100 | CF100 | CF100 | CF100 | CF100 | CF100 |
| Adhesiveness: coated plate 3 | CF100 | CF100 | CF100 | CF100 | CF100 | CF100 |

The components described in Table 1 above are as follows.

Compound (b1-1): The HDI-TMP adduct (synthesized product) represented by Formula (5) above Compound (b1-2): The HDI isocyanurate (D170N, manufactured by Mitsui Chemicals) represented by Formula (8) above Adhesion promoter B-1 to B-5: Each adhesion promoter described above Organotin compound C-1: The reaction product of 1,3-diacetoxy-1,1,3,3-tetrabutyldistannoxane and ethyl silicate, reacted at the molar ratio of 1:1

Organotin compound C-2: Dibutyltin diacetylacetonate (manufactured by Nihon Kagaku Sangyo Co., Ltd.)

Tertiary amine compound D-1: Dimorpholinodiethylether (manufactured by San-Apro Ltd.)

Tertiary amine compound D-2: N,N-dimethylamino ethylmorpholine (manufactured by Air Products and Chemicals, Inc.)

Adhesion promoter X-1 to X-5: Each adhesion promoter described above

Adhesion promoter Y-1: γ-N-phenylaminopropyltrimethoxysilane (KBM573, manufactured by Shin-Etsu Chemical Co., Ltd.)

According to the results shown in Table 1 above, Comparative Examples 1 to 8, in which the adhesion promoter (B) (obtained by reacting a compound (b1) having three or more isocyanate groups with a compound (b2) of at least one type of a compound selected from the group consisting of compounds represented by Formula (1) to (4) described above and hydrogenated compounds of compounds represented by Formula (1) to (3) described above) was not blended, was found to have inferior adhesion to a coated plate 3 (coating material: Acryl/Silicon-type coating material).

In particular, not only Comparative Examples 1, 2 and 8, in which the conventionally known HDI-TMP adduct, HDI isocyanurate, and aminosilane were blended as a adhesion promoter, but also Comparative Examples 5 to 7, in which the adhesion promoters X-3 to X-5 that had similar structures to that of the adhesion promoter (B) were blended, were found to exhibit poor adhesion.

In contrast, all of Working Examples 1 to 22, in which a specific amount of the adhesion promoter (B) was blended, were found to exhibit excellent adhesion to the coated plate.

In particular, from the comparison between Working Examples 1 to 3 and Example 22, if the content of the adhesion promoter (B) was 0.1 to 5.0 parts by mass per 100 parts by mass of the preliminary composition, breaking elongation was found to be excellent.

Also, from the comparison between Working Examples 2, 4, and 5, and Working Example 18, if the content of the organotin compound (C) was 0.001 to 0.5 parts by mass per 100 parts by mass of the preliminary composition, heat-resistant adhesiveness was found to be excellent.

Additionally, from the comparison between Working Example 2 and Working Examples 19 to 21, if the content of N,N-dimethylamino ethylmorpholine used as tertiary amine compound (D) was 0.01 to 2.0 parts by mass per 100 parts by mass of the preliminary composition and the content of dimorpholinodiethylether was 0.01 to 2.0 parts by mass per 100 parts by mass of the preliminary composition, high-temperature/high-humidity adhesiveness and curability were found to be excellent.

The invention claimed is:

1. A one-part moisture-curable polyurethane composition comprising:
   a preliminary composition containing a urethane prepolymer (A); and
   an adhesion promoter (B);
   the adhesion promoter being a reaction product of
   a compound (b1)having three or more isocyanate groups; and
   a compound (b2)of at least one of a compound selected from the group consisting of compounds represented by Formula (1) to (4) and hydrogenated compounds of compounds represented by Formula (1) to (3);
   wherein a ratio (NCO/OH) between an isocyanate group (NCO) of the compound (b1) and a hydroxy group (OH) of the compound (b2) is 1.2 to 3.2;
   a content of the adhesion promoter (B) being 0.1 to 10 parts by mass per 100 parts by mass of the preliminary composition; and
   a diisocyanate compound used in the production of the compound (b1) is an aliphatic polyisocyanate,

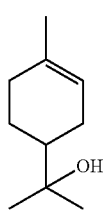
(1)

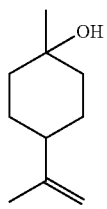
(2)

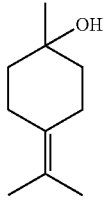
(3)

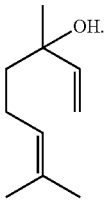
(4)

2. The one-part moisture-curable polyurethane composition according to claim 1, further comprising an organotin compound (C), wherein a content of the organotin compound (C) is 0.001 to 0.5 parts by mass per 100 parts by mass of the preliminary composition.

3. The one-part moisture-curable polyurethane composition according to claim 1, further comprising a tertiary amine compound (D), wherein a content of the amine compound (D) is 0.01 to 4 parts by mass per 100 parts by mass of the preliminary composition.

4. The one-part moisture-curable polyurethane composition according to claim 1, wherein the compound (b1) is at least one selected from the group consisting of a reaction product of diisocyanate compound and trimethylolpropane or glycerin at a ratio NCO/OH of 1.8 to 2.2, biurets of the diisocyanate compounds and isocyanurates of the diisocyanate compound.

5. The one-part moisture-curable polyurethane composition according to claim 2, further comprising a tertiary amine compound (D), wherein a content of the amine compound (D) is 0.01 to 4 parts by mass per 100 parts by mass of the preliminary composition.

6. The one-part moisture-curable polyurethane composition according to claim 2, wherein the compound (b1) is at least one selected from the group consisting of a reaction product of diisocyanate compound and trimethylolpropane or glycerin at a ratio NCO/OH of 1.8 to 2.2, biurets of the diisocyanate compounds and isocyanurates of the diisocyanate compound.

7. The one-part moisture-curable polyurethane composition according to claim 3, wherein the compound (b1) is at least one selected from the group consisting of a reaction product of diisocyanate compound and trimethylolpropane or glycerin at a ratio NCO/OH of 1.8 to 2.2, biurets of the diisocyanate compound and isocyanurates of the diisocyanate compound.

8. The one-part moisture-curable polyurethane composition according to claim 5, wherein the compound (b1) is at least one selected from the group consisting of a reaction product of diisocyanate compound and trimethylolpropane or glycerin at a ratio NCO/OH of 1.8 to 2.2, biurets of the diisocyanate compounds and isocyanurates of the diisocyanate compound.

9. The one-part moisture-curable polyurethane composition according to claim 2, wherein the organotin compound (C) is a reaction product of 1,3-diacetoxy-1,1,3,3-tetrabutyldistannoxane and ethyl silicate at molar ratio of 1:0.8 to 1:1.2.

* * * * *